United States Patent [19]
Rossi

[11] Patent Number: 5,300,753
[45] Date of Patent: Apr. 5, 1994

[54] METHODS AND APPARATUS FOR FUSING ELECTRICAL CONDUCTORS

[75] Inventor: Alessandro Rossi, Florence, Italy

[73] Assignee: Axis USA, Incorporated, Marlborough, Mass.

[21] Appl. No.: 903,910

[22] Filed: Jun. 25, 1992

[51] Int. Cl.⁵ .............................................. B23K 11/24
[52] U.S. Cl. ............................... 219/110; 219/86.51; 219/87; 219/91.1; 219/91.21
[58] Field of Search ............... 219/110, 86.51, 56.1, 219/56.21, 56.22, 87, 91.1, 91.21

[56] References Cited

U.S. PATENT DOCUMENTS

| | | | |
|---|---|---|---|
| 3,727,822 | 4/1973 | Umbaugh | 219/110 |
| 4,001,539 | 1/1977 | Franchi et al. | 219/110 |
| 4,734,556 | 3/1988 | Namiki | 219/110 |
| 4,876,431 | 10/1989 | Livingston | 219/110 |
| 4,973,815 | 11/1990 | Ito et al. | 219/110 |
| 5,063,279 | 11/1991 | Rossi | 219/86.51 |
| 5,072,090 | 12/1991 | Morita | |
| 5,138,127 | 8/1992 | Fries et al. | 219/86.51 |

FOREIGN PATENT DOCUMENTS

| | | |
|---|---|---|
| 0185629 | 6/1986 | European Pat. Off. |
| 4113117 | 5/1992 | Fed. Rep. of Germany |
| 1-228677 | 9/1989 | Japan |

OTHER PUBLICATIONS

Black & Webster, "Small Parts Resistance Welding," brochure (1990).
Joyal Products, Inc., "Model 92-TT 'Tang Top' Commutator Fusing machine", brochure (1991).
Modern Machine Development Corporation, "Model AHSM-100 M," brochure (1991).
Modern Machine Development Corporation, "New Advancements in Commutator Fusing," brochure (1991).
Warner, A., "Up and Down Slope Control," Joyal Products *Technical Brochure* (1975).

*Primary Examiner*—Clifford C. Shaw
*Attorney, Agent, or Firm*—Robert R. Jackson; Robert W. Morris

[57] ABSTRACT

Methods and apparatus for fusing together electrical conductors to a commutator are provided. A precise, timed, and controlled delivery of electric current to the fusing electrode of the fusing machine is achieved. A generic supply signal is converted into a precise and constant input signal through the use of monitoring and feedback techniques, which compare the current status of the physical and electrical phases of the fusing operation to various predetermined fusing profiles to determine the proper application of current to the fusing electrode.

39 Claims, 5 Drawing Sheets

1

METHODS AND APPARATUS FOR FUSING ELECTRICAL CONDUCTORS

BACKGROUND OF THE INVENTION

This invention relates to fusing machines, and more particularly, to machines for fusing the armature wires of an electric motor, and the application and control of electric current to generate heat during the fusing operations.

Fusing machines are widely used for fusing armature wires to commutators, and stator wires to terminal boards, of electric motors. Commutators typically have tangs or slots to which the wires are attached. Terminal boards typically have contact hooks for wire attachment. A typical armature fusing operation involves applying a physical force from the fusing electrode to the tang or slot being fused. Next, current is applied to the fusing electrode, which passes through the commutator to a ground electrode. The resistance of the fusing electrode is higher than that of the commutator, causing the fusing electrode to heat. The heat is thermally transferred to the point of contact between the fusing electrode and the commutator. Additional physical force may be used, as well as additional applications of current, to complete the fusing operation. A similar set of steps is required for stator fusing operations.

Precise control of the physical and electrical phases of the fusing operation has been difficult to achieve. U.S. Pat. No. 5,063,279 describes a fusing machine having precise control of the physical phases of the fusing operation. The application of force from the fusing electrode to the commutator bar (or terminal board) and wires is performed according to predetermined force or displacement functions. This provides a fusing machine that continuously monitors electrode force or displacement and provides rapid feedback for maintaining a precise application of force throughout the fusing operation.

Precise control of the electrical phases of fusing operations has yet to be achieved. The lack of precise control of the application of current during fusing can cause unintentional significant heating to occur (such as throughout the commutator bar). The production of modern commutator cores includes materials that are more sensitive to heat than previous materials (e.g., asbestos). The structural characteristics of these modern cores may be altered by uncontrolled significant heating, thereby causing impairment of the core materials' ability to anchor the commutator bars. This might result in, for example, the commutator bars coming loose from centrifugal force during normal operation of the motor. Similar advantages exist with stator terminal boards due to the use of extremely variable metal alloys in terminal board construction.

The quality of the fused joint is also affected by the level of precision used in the application of current during fusing. The heat generated by the fusing electrode provides two main purposes. First, the applied heat causes a plastic deformation to occur to the parts being fused without their temperature reaching a molten state (unlike welding). Second, the applied heat is used to vaporize the insulation of the wire being connected to the commutator (or terminal board). This vaporization is critical to the efficient production of motor windings. When sufficient heat is not generated in a precise manner, there is not consistent and complete removal of insulation from the wire. Additionally, the imprecise application of heat during tang fusing can result in unreliable cohesion joints between the commutator and the wire.

In an effort to try to achieve high quality fusing, time consuming and complex operations must be undertaken to set up the fusing machine. Such operations could be avoided if a fusing machine could precisely apply various levels of current at the proper time throughout the fusing operation. Additionally, a more precise delivery of heat during fusing would result in an overall reduction in heat required and a saving of energy consumed during the overall fusing operation.

Conventional systems exist which supply current in the form of impulses which are derived from a normal sinusoidal alternating current (AC) supply line. One such invention is described in U.S. Pat. No. 4,001,539, which describes a control system that supplies electric current to welding electrodes. This system is based on supplying a series of current pulses, which represent slices of the sinusoidal input signal, as a series of output pulses. Current amplitude is varied by affecting a phase shift as to when, and for how long, the output pulses are supplied to the welding electrode.

Current delivery by pulsing requires that relatively long pauses occur between the delivery of each output pulse while waiting for the input signal to reach the desired amplitude or phase again. The long pauses are impractical when attempting to achieve precise control of the delivery of current during fusing operations. Further, the long pauses prevent synchronization between complex physical phase profiles and electrical supply profiles because typical regulating supplies can not keep pace with the rapid changes in current requirements. In addition, the long pauses require that the applied current be delivered at higher levels than would be necessary if the current were applied continuously in order to achieve proper heating. The higher current causes accelerated deterioration of the electrode (cratering, where holes form in the electrode surface), thereby reducing the life of the electrode.

It would therefore be desirable to provide a fusing machine which applies electric current in a manner which is consistent with the time of any variation during fusing operations. It would also be desirable to provide a fusing machine which limits significant heating to only the parts which form the fused joint. It would also be desirable to provide a fusing machine which provides consistent and complete removal of wire insulation, and in the case of tang fusing, a more reliable cohesion joint. It would also be desirable to provide a fusing machine which does not require complex and time consuming set-up operations to achieve high quality fusing. It would also be desirable to provide a fusing machine that requires less heating and energy to perform fusing operations. It would also be desirable to provide a fusing machine which provides current delivery in such manner that reduces electrode deterioration.

SUMMARY OF THE INVENTION

In view of the foregoing, it is an object of this invention to provide an improved fusing machine that applies electric current to fusing electrodes in a manner which is consistent with the time of any variation during fusing operations.

It is a further object of this invention to provide an improved fusing machine which limits significant heating to only the parts which form the fused joint.

It is another object of this invention to provide an improved fusing machine which produces more complete and consistent removal of wire insulation during fusing operations.

It is still a further object of this invention to provide an improved fusing machine which produces more reliable cohesion joints during tang fusing operations.

It is still another object of this invention to provide an improved fusing machine which does not require complex and time consuming set-up operations in order to achieve high quality fusing.

It is another object of this invention to provide an improved fusing machine which requires less heating and less energy to perform fusing operations.

It is another object of this invention to provide an improved fusing machine which delivers current in such manner that electrode deterioration is reduced.

These and other objects of the invention are accomplished in accordance with the principles of the invention by providing an improved fusing machine having regulation and control circuitry which produces a precise supply of electric current to fusing electrodes during fusing operations. The control circuitry utilizes monitoring and feedback principles to control the generation of an input signal to the fusing electrode. The monitored signals are compared to predetermined values which correspond to different phases of fusing operations in order to generate adjustment signals.

The fusing machine includes the capability to provide current, voltage, power, or energy regulation by using feedback sensors which measure the current and voltage being utilized by the fusing electrode. These feedback signals are compared to predetermined reference signals to provide error correction signals to the input signal generation circuitry. The predetermined reference signals are related to the method being used to control the physical operation of the fusing electrode (force performance or programmed displacement). Other feedback signals are provided by a load cell and a displacement transducer to show the current status of the physical phase of the fusing operation.

The fusing machine further includes control circuitry which stores various operational profiles to accommodate the various phases of many different fusing operations. Such fusing operations are often characterized by extremely short timings and different heating requirements which require a more precise delivery of electric supply. The control circuitry receives inputs from the end-user, electrical feedback signals, and physical feedback signals and compares the inputs to stored profiles to establish the proper adjustments required to achieve precise current delivery to the fusing electrode.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
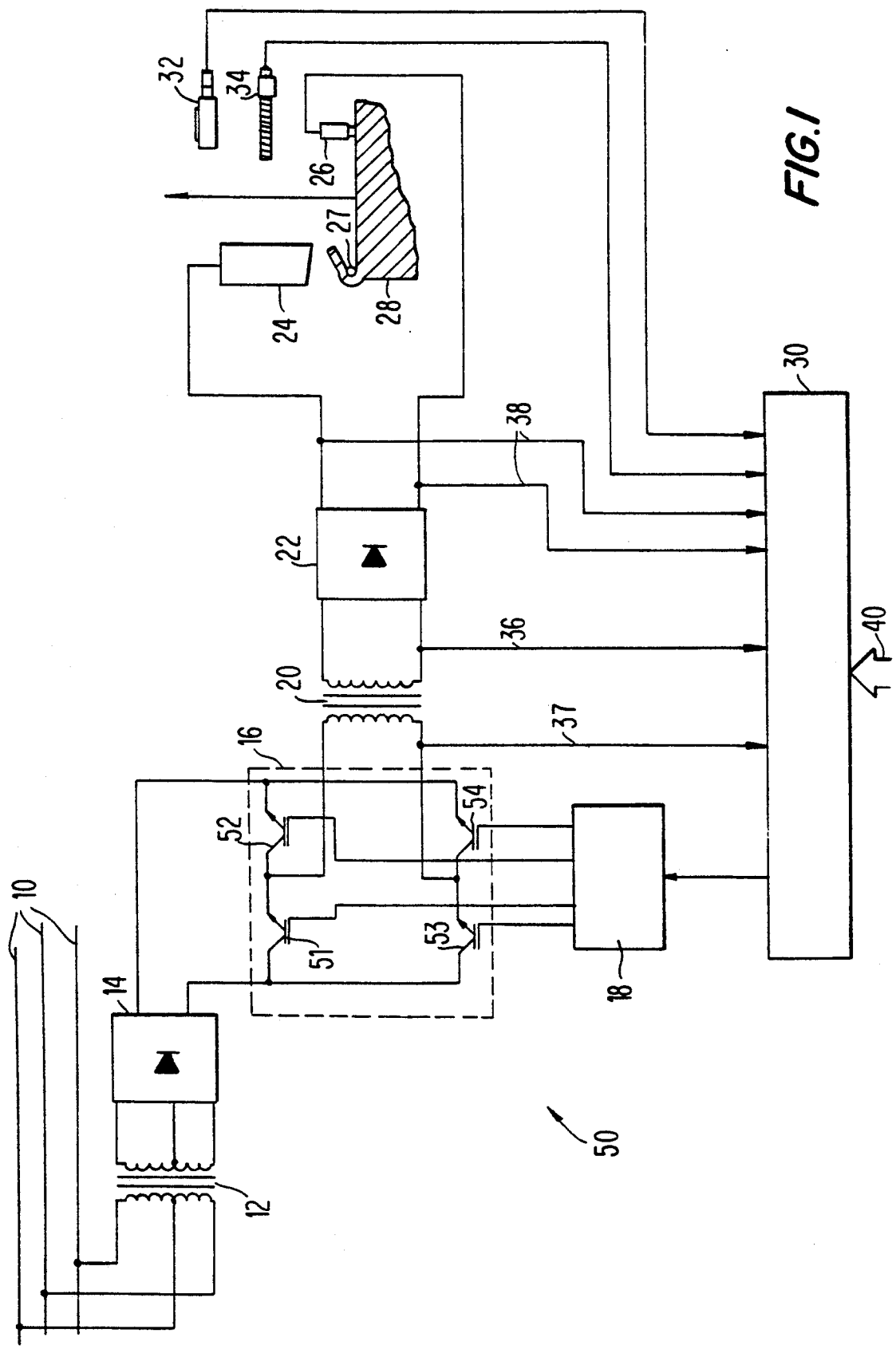
FIG. 1 is a schematic block diagram of an embodiment of the present invention.
Figure 2:
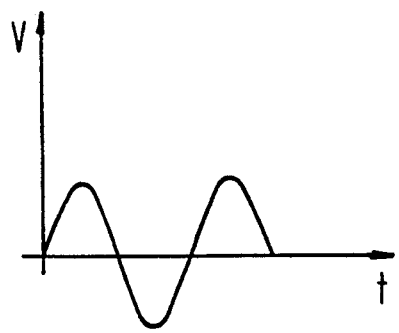
FIG. 2 is a graph displaying voltage versus time of one phase of a sample three phase supply signal.
Figure 3:
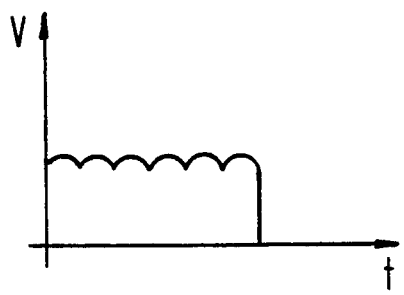
FIG. 3 is a graph displaying the same signal as FIG. 2 after it has passed through a full wave rectifying circuit.

FIG. 1 shows a schematic block diagram of regulation circuit 50 of the present invention. In FIG. 1, regulation circuit 50 is used to fuse wire 27 to commutator bar 28. Three-phase AC supply line 10 supplies a generic AC signal (50-60 Hz), a single-phase of which is shown in FIG. 2, to transformer 12. Transformer 12 lowers the voltage of the input signal before passing the signal to full-wave rectifying bridge 14. Rectifying bridge 14 provides a rectified signal which is relatively stable and has low ripple, as shown in FIG. 3. This rectified signal is fed to single-phase inverter bridge 16, which comprises NPN-transistors 51, 52, 53, and 54. Inverter bridge 16 may be comprised of other types of transistors (e.g, PNP transistors) without affecting the scope of the invention. The essential principle is that a minimum of two pairs of transistors are configured into an H-structure between the two supply lines. An output line from bridge 16 is connected to the center of each pair of transistors, as described below. By alternatively triggering each pair of transistors on and off, a full-wave rectangular square wave signal is generated across the output lines.

In one embodiment of the invention, NPN-transistors 51, 52, 53, and 54 of inverter bridge 16 are configured in pairs with transistors 51 and 52 comprising a first pair and transistors 53 and 54 comprising a second pair. Each of transistors 51-54 has a base, which is connected to driver 18, a collector and an emitter. The collectors of transistors 51 and 53 are connected in parallel to one of the outputs of rectifying bridge 14, and to each other. The emitters of transistors 52 and 54 are connected in parallel to the other output of rectifying bridge 14, and to each other. The connection of the emitter of transistor 51 and the collector of transistor 52 forms a node which is also connected to one of the outputs of inverter bridge 16. A similar connection is made by the emitter of transistor 53 and the collector of transistor 54 to form the other output of inverter bridge 16.

Figure 4:
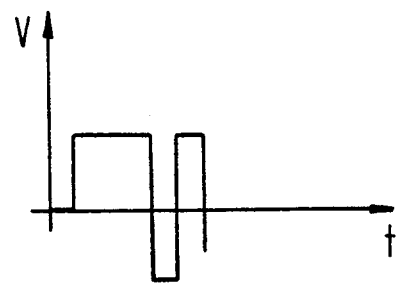
FIG. 4 is a graph displaying a sample pulse width modulated (PWM) rectangular wave form signal which is used as a control signal as part of this invention.
Figure 5:
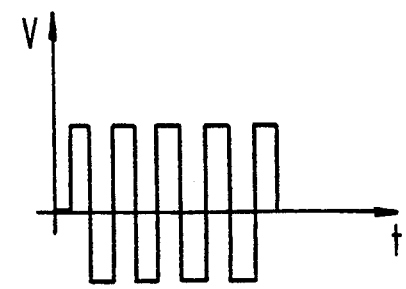
FIG. 5 is a graph displaying a sample rectangular wave form signal which represents the processed signal of FIG. 3 in accordance with the principles of this invention.
Figure 6:
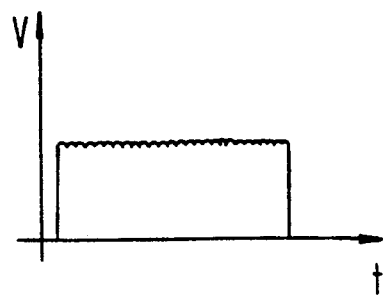
FIG. 6 is a graph displaying a sample output signal of this invention which is supplied to the fusing electrode.

The triggering of transistors 51-54 (turning them on and off) is controlled by a pulse width modulated (PWM) rectangular wave form signal supplied to the base of each transistor by driver 18. An effective frequency of such triggering is typically about 2 KHZ, which enables the regulation circuit to be synchronized with the changing phases of the fusing electrode movement control system. A typical trigger signal is shown in FIG. 4. The trigger signals are supplied to transistors 51-54 in such a manner that each pair of transistors is alternatively switched on and off, thereby generating a full-wave rectangular square wave form signal. The outputs of inverter bridge 16 are connected across the input of transformer 20 so that the output of transformer 20 will be an alternating current rectangular square wave form signal, a sample of which is shown in FIG. 5. The amplitude of the square wave form signal can be changed by varying the triggering signals of driver 18.

The rectangular square wave form of transformer 20 is passed through single-phase full-wave rectifying bridge 22 to produce the final output signal. The output signal is transmitted through fusing electrode 24 and commutator bar 28, and returns through grounding electrode 26. The impedance of transformer 20 and other filtering devices (not shown) guarantee that this non-oscillating signal has virtually no ripple, making it similar to applying direct voltage across the electrodes. This provides a stable, controllable, precise signal which has the advantages of a direct voltage supply.

Regulation circuit 50 can be operated in several different modes including: current, voltage, power, or energy regulation. The different modes are accomplished through the use of current feedback lines 36 and 37, and voltage feedback lines 38. Line 36 measures the instantaneous current load of fusing electrode 24 at the secondary of transformer 20, while line 37 measures current load at the primary of transformer 20. Lines 38 measure the voltage across fusing electrode 24. The feedback signals are compared to predetermined reference signals by controller 30 to establish current and voltage error signals. The error signals are very precise because the current on each side of transformer 20 is known, which enables controller 30 to monitor the saturation effect of transformer 20 and adjust the error signals accordingly. Controller 30 converts the error signals into command signals which are passed to driver 18. Driver 18 adjusts the triggering signals supplied to transistors 51-54 to cause rapid and accurate system response to variations in fusing operations.

The predetermined reference signals are related to the specific displacement or force application profile that is currently being used to control the movement of fusing electrode 24. Controller 30 synchronizes the fusing electrode movement commands with the regulation supply commands according to predefined profiles. These commands are based on feedback inputs received from load cell 32, which monitors the force performance of fusing electrode 24, or transducer 34, which monitors the displacement of electrode 24. Based on these feedback inputs, or user-inputs received from line 40, controller 30 commands the regulating supply to change from one reference signal to another, as well as commanding the current supply to turn on and off.

Figure 7:
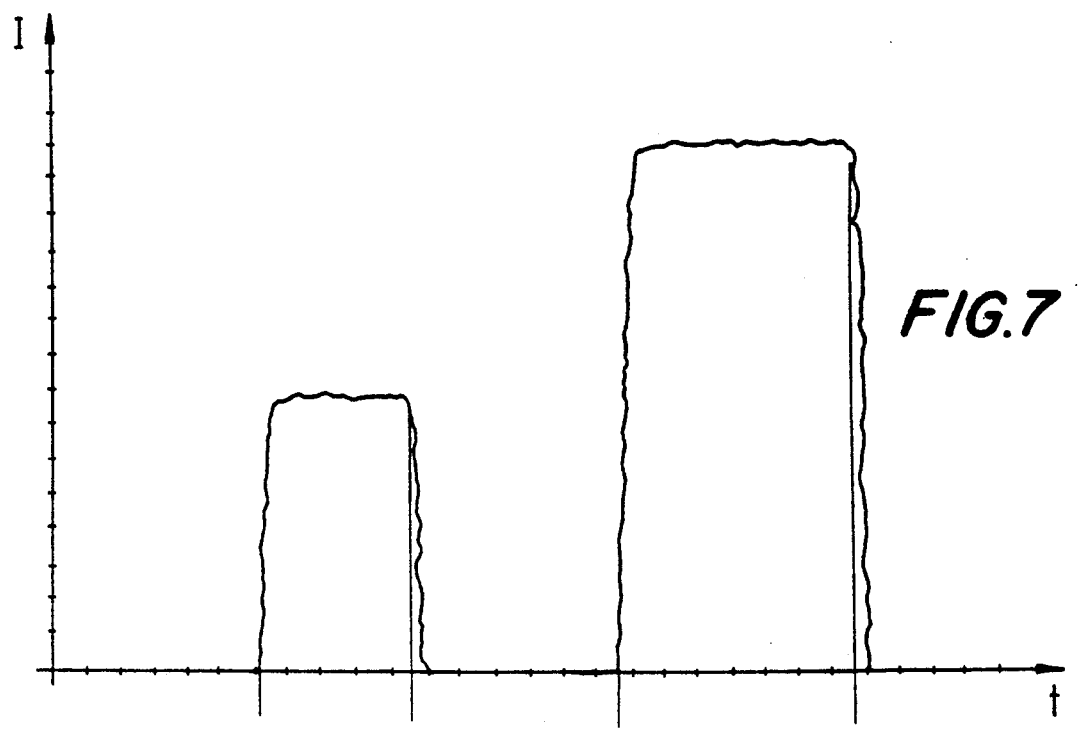
FIG. 7 is a graph displaying the required application of current versus time for a sample tang fusing operation in accordance with the principles of this invention.
Figure 8:
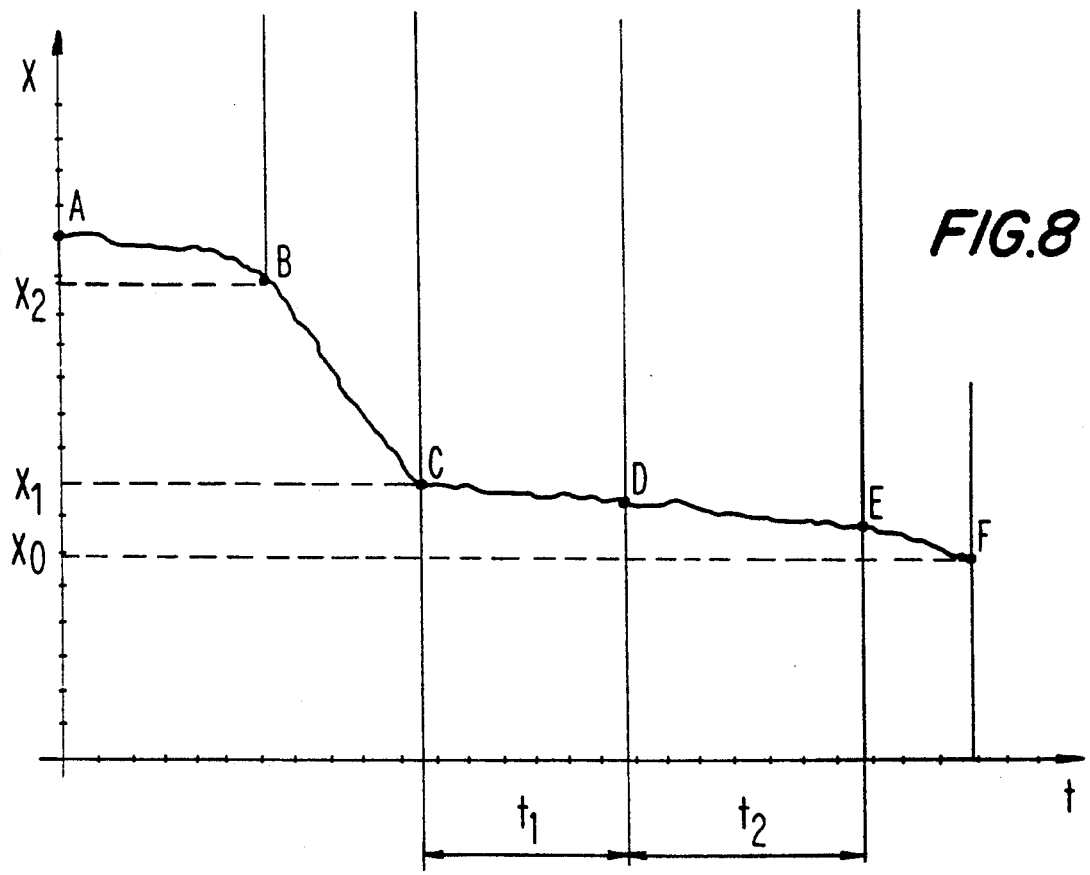
FIG. 8 is a graph displaying a displacement profile of displacement versus time for the sample tang fusing operation of FIG. 7. (The time base for FIGS. 7 and 8 is the same).
Figure 9:
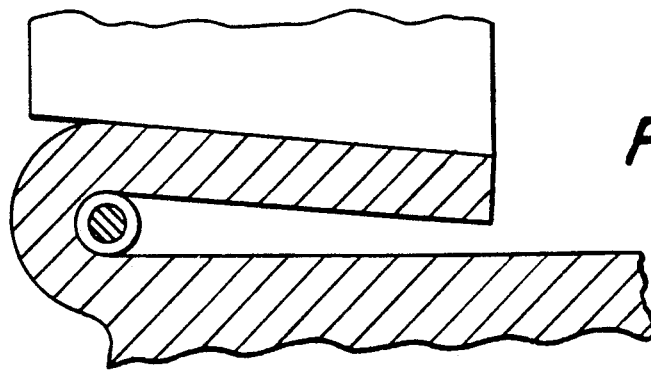
FIGS. 9-11 are partial elevational views of an electrode fusing a commutator tang and armature wire to a commutator bar.

FIGS. 7 and 8 display current and displacement profiles for part of a typical fusing operation. FIG. 7 is a graph of current (I) versus time (t) which shows part of a fusing cycle requiring two separate applications of current, each at a different amplitude, to the fusing electrode. FIG. 8 is a graph of displacement (X) versus time (t) for the same fusing cycle as FIG. 7, divided into five different phases. In phase A-B, closed loop displacement control is used to advance the fusing electrode according to predetermined speeds to contact and deform the commutator tang. As this invention is primarily concerned with the delivery of current during fusing, phase A-B represents only the final portion of the initial deforming phase. The phase ends when displacement X2 is monitored, which represents the point of maximum surface contact between the electrode and the commutator (as shown in FIG. 9).

Figure 10:
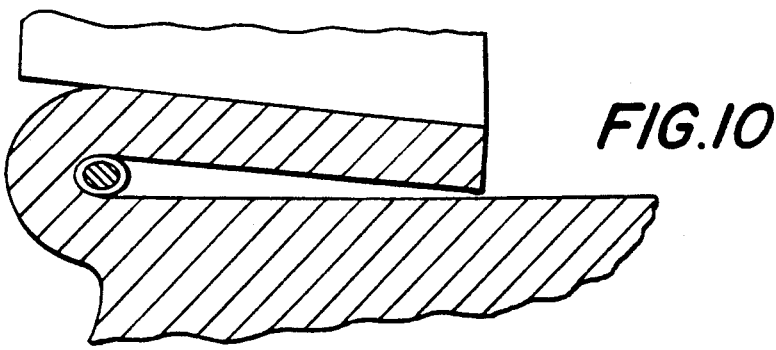

After maximum surface contact has been achieved, electrode movement is controlled according to predetermined profiles using closed loop force control. During phase B-C, a first level of current is supplied to the fusing electrode and deforming continues until displacement point X1 is reached and the current supply is turned off. An illustration of this state is given in FIG. 10. Also during this phase, the controller compares the displacement with predetermined profiles in order to adjust the remaining phases, and forces to be applied, to achieve the highest quality fused joint.

Figure 11:
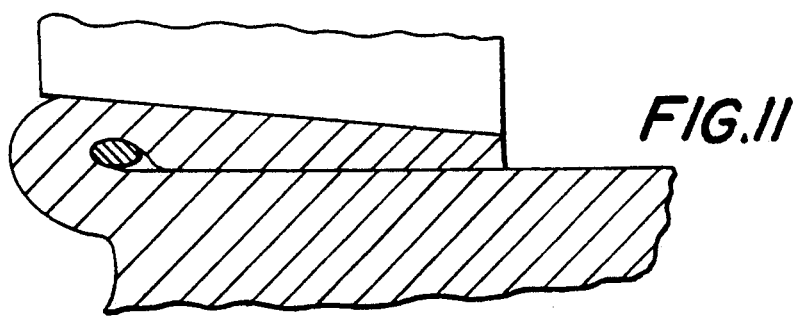

Phase C-D is a rest phase which lasts for time t1, where neither current, nor force is applied to the commutator bar. During phase D-E, a higher level of current is supplied and force is re-applied in order to complete vaporization of the wire insulation and form a high quality fused joint. At time t2, the current supply is turned off, but force continues to be applied, until displacement X0 is reached. As shown in the illustration in FIG. 11, plastic deformation of the components is complete, without having had to reach a molten state, and the wire insulation is, essentially, completely vaporized. The fusing electrode is then removed and the cycle begins for another fusing operation.

Figure 12:
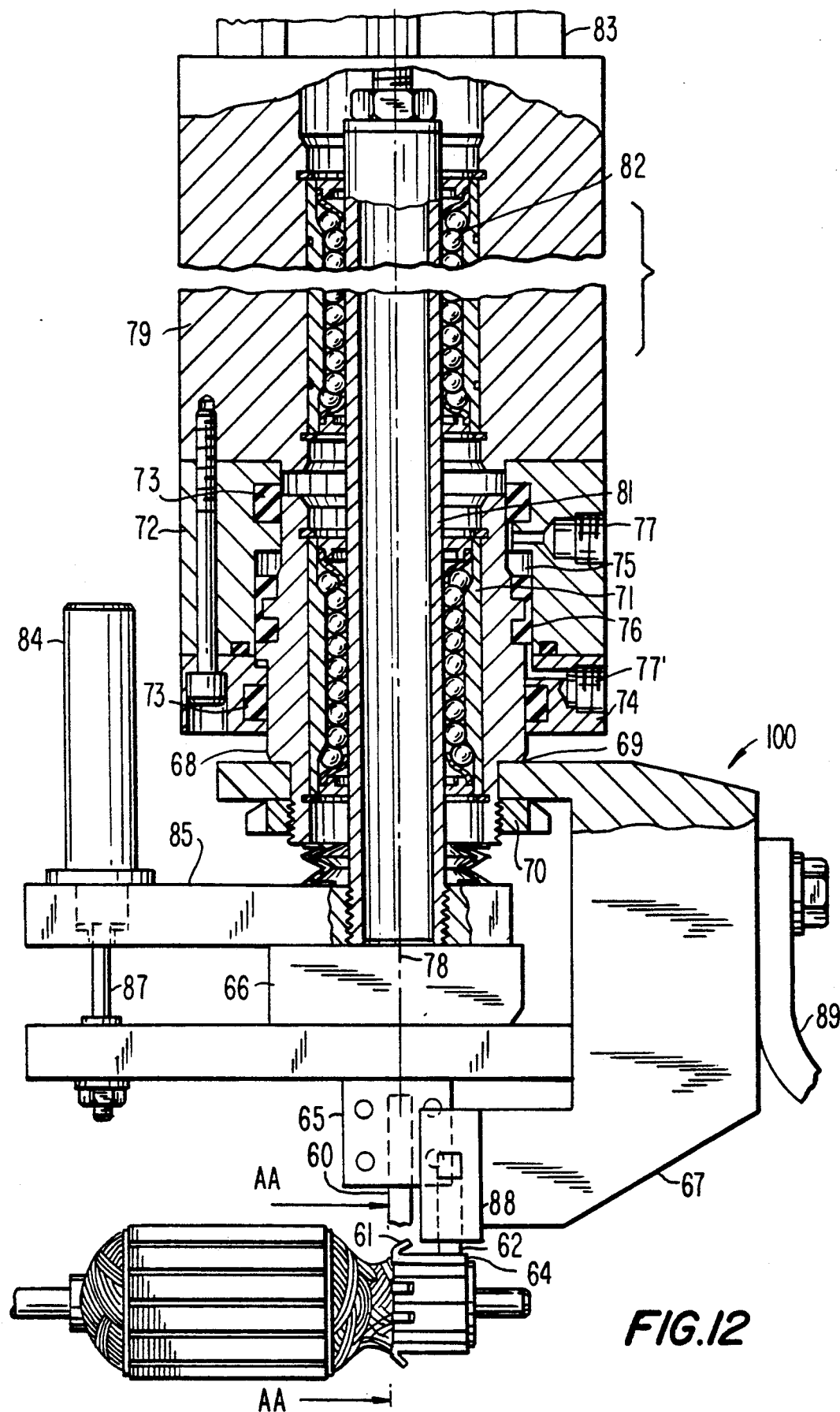
FIG. 12 is a cross-sectional view of an illustrative embodiment of a fusing machine constructed in accordance with the principles of this invention.

FIG. 12 shows a cross-sectional view of an illustrative embodiment of fusing machine 100 constructed in accordance with the principles of this invention. Fusing electrode 60 contacts and deforms tang 61 while ground electrode 62 maintains firm contact with commutator bar 64.

Fusing electrode 60 is rigidly connected to support member 65 which is releasably connected to cooling block 66. Ground electrode 62 is rigidly connected to support member 88 which is releasably connected to structure member 67 (which further operates as a cooling block). Current passage braid 89 is fixedly connected to member 67 to provide a safety ground path for machine 100. A similar braid (not shown) is fixedly connected to cooling block 66. Structure member 67 is rigidly mounted against shoulder 69 of piston member 68 by means of threaded ring 70. Recirculating guide member 71 is rigidly mounted inside piston member 68 to enable piston member 68 to slide on hollow shaft 81. Keys (not shown) are provided to prevent piston member 68 from rotating about hollow shaft 81.

Cylinder member 72 is provided with seals 73 and lid 74 for forming air compartments 75 and 76. Bores 77 and 77' allow pressurized air to be supplied to compartments 75 and 76 so that piston member 68, and therefore ground electrode 62, can be translated along axis 78 to contact commutator bar 64. Cylinder member 72 is flanged to the distal end of carriage 79, which is connected to a frame structure (not shown) by means (not shown). Hollow shaft 81 is supported on guide 82 having recirculating balls and mounted in carriage 79. Linear actuator 83 is flanged to the proximal end of carriage 79, which is connected to the proximal end of hollow shaft 81 for translating hollow shaft 81 along axis 78. The distal end of hollow shaft 81 carries support plate 85, which is rigidly connected to cooling block 66. Linear potentiometer 84, having movable shaft 87, is removably connected to support plate 85. Movable shaft 87 is removably connected to an extension of support structure 67.

Figure 13:
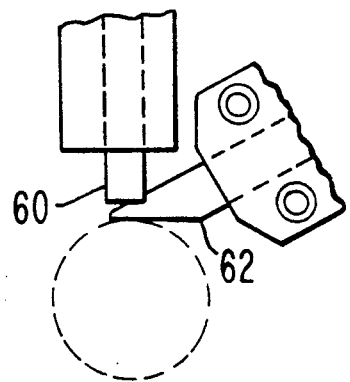
FIG. 13 is a partial, cross-sectional view taken along line AA—AA of the commutator bar, fusing electrode, and grounding electrode.

A sample operation of this fusing assembly is now described. Carriage 79 is translated by means not shown to place electrodes 60 and 62 in their rest position for a required commutator size. Cylinder compartment 75 is then pressurized to cause piston member 68, and therefore ground electrode 62, to translate parallel to axis 78 in order to make contact with commutator 64. This causes linear potentiometer shaft 87 to extend until contact with the bar is reached (this position is shown in FIG. 13). Readings from linear potentiometer 84 can be used by controller 30 to identify the exact position of commutator bar 64 with respect to an absolute reference. In moving along axis 78, ground electrode 62 is guided by means of ball recirculating guide 71 mounted on hollow shaft 81, as previously described. Fusing electrode 60 can then be advanced by activating linear actuator 83 through conventional devices for regulating the fusing force and displacement to be reached in accordance with a predetermined performance profile. By operating in this manner, the deformation required during the fusing operation can be precisely referenced to the commutator bar having the tang to be fused. These precise references are used by this invention to supply a synchronized, rapidly responsive, supply of current to the fusing electrode.

It will be understood that the foregoing is merely illustrative of the principles of this invention, and that various modifications can be made by those skilled in the art without departing from the scope and spirit of the invention. For example, the entire fusing operation described above can be accomplished using a terminal board instead of a commutator bar. The physical force and electric current would be applied to the terminal board hook instead of the commutator tang to form the fused joint.

The invention claimed is:

1. Apparatus for fusing at least one armature wire and at least one piece of commutator material together, said apparatus, comprising:
    a fusing member for applying force and varying heat to soften said commutator material to deform said commutator around said armature wire;
    a grounding member;
    means for moving said fusing member relative to said armature wire and said commutator material in order to cause said fusing member to contact and apply force to said commutator material thereby deforming said commutator material intimately around said armature wire;
    means for controlling said means for moving said fusing member in accordance with a predetermined physical delivery function to control said applied force;
    means for regulating a precise flow of current through said armature wire and said commutator material from said fusing member to said grounding member to generate said varying heat in said fusing member in accordance with a predetermined electrical delivery function to regulate said precise flow of current and thereby regulate the level of said varying heat so that said commutator material is softened and therefore, said deforming is precisely controlled, and so that insulation on a portion of said armature wire within said softened deformed commutator material is vaporized; and
    means for synchronizing said means for controlling and said means for regulating in order to supply a precise varying level and quantity of heat from said fusing member to said armature wire and said commutator material at specific, predetermined time intervals, such that said regulating means is essentially instantaneously responsive to the short timings and different heating requirements which occur during fusing of said armature wire to said commutator material.

2. The apparatus defined in claim 1 wherein said means for regulating comprises:
    a source of potential supplying a three-phase alternating current (AC) signal; and
    a control circuit for converting said AC signal to a precise level of non-oscillating voltage.

3. The apparatus defined in claim 2 wherein said control circuit comprises:
    a first full-wave rectifying bridge for rectifying said AC signal, said first rectifying bridge having an input connected to said source of potential and two output terminals;
    a converter circuit for converting said rectified signal into a rectangular full-wave form signal, said converter circuit having two input terminals connected to the output terminals of said first rectifying bridge and two output terminals; and
    a second full-wave rectifying bridge for rectifying said rectangular full-wave form signal into an output signal having a single polarity and essentially no ripple, said second rectifying bridge having two input terminals connected to said output terminals of said converter circuit and two output terminals being connected to said fusing member.

4. The apparatus defined in claim 3 wherein said converter circuit comprises:
    a bridge circuit comprised of at least two transistor pair circuits, each transistor pair circuit being connected between said output terminals of said first rectifying bridge, and each transistor pair circuit having an output node which provides one of said output terminals of said converter circuit; and
    a driver circuit which supplies a plurality of transistor trigger signals to said bridge circuit to control the operation of said bridge circuit such that said bridge circuit generates said rectangular full-wave form signal.

5. The apparatus defined in claim 4 wherein each of said transistor pair circuits comprise:
    a pair of transistors, which provide a rectangular half-wave form signal, comprising first and second transistors, each transistor having a base uniquely connected to said driver circuit, a collector, and an emitter, said collector of said first transistor being connected to a first of said output terminals of said first rectifying bridge, said collector of said second transistor being connected to both said emitter of said first transistor and said output node, and said emitter of said second transistor being connected to a second of said output terminals of said first rectifying bridge.

6. The apparatus defined in claim 5 wherein said converter circuit further comprises:
    a current feedback sensor for measuring said current component of said rectangular full-wave form signal; and
    comparing circuit means for comparing said current component to a first predefined reference signal, said comparing circuit having an output connected to said driver circuit whereby said comparing circuit means provides error correction input signals to said driver circuit which cause said driver circuit to change said transistor trigger signals.

7. The apparatus defined in claim 6 wherein said converter circuit further comprises:
   a voltage feedback sensor for measuring said voltage component of said rectangular full-wave form signal; and
   said comparing circuit means for comparing said voltage component to a second predefined reference signal, said comparing circuit means having an output connected to said driver circuit whereby said comparing circuit means provides error correction input signals to said driver circuit which cause said driver circuit to change said transistor trigger signals.

8. The apparatus defined in claim 4 wherein said converter circuit further comprises:
   a voltage feedback sensor for measuring said voltage component of said rectangular full-wave form signal; and
   comparing circuit means for comparing said voltage component to a predefined reference signal, said comparing circuit means having an output connected to said driver circuit whereby said comparing circuit means provides error correction input signals to said driver circuit which cause said driver circuit to change said transistor trigger signals.

9. The apparatus defined in claim 4 wherein said converter circuit further comprises a transformer connected between said bridge circuit and said second full-wave rectifying bridge.

10. The apparatus defined in claim 9 wherein said means for regulating further comprises a transformer connected in series between said source of potential and said controlling circuit.

11. The apparatus defined in claim 1 wherein said means for controlling provides status signals corresponding to a status point within said predetermined fusing function.

12. The apparatus defined in claim 11 wherein said means for regulating provides feedback signals corresponding to said flow of current to said fusing member.

13. The apparatus defined in claim 12 wherein said means for synchronizing comprises:
   means for comparing, which uses said status signals to determine a required level of said flow of current and compares said feedback signals to said required level of said flow of current to generate adjustment signals; and
   means for applying said adjustment signals to said means for regulating in order to maintain said flow of current at said required level.

14. The apparatus defined in claim 13 wherein said means for regulating comprises:
   a first full-wave rectifying bridge for rectifying an alternating current (AC) input signal, said first rectifying bridge having an input connected to a source of potential supplying a three-phase AC signal and two output terminals;
   a bridge circuit comprised of at least two transistor pair circuits, each transistor pair circuit being connected between said output terminals of said first rectifying bridge, and each transistor pair circuit having an output node which provides an output terminal of said bridge circuit;
   a driver circuit which supplies a plurality of transistor trigger signals to said bridge circuit to control the operation of said bridge circuit such that said bridge circuit generates a rectangular full-wave form signal; and
   a second full-wave rectifying bridge for rectifying said rectangular full-wave form signal into an output signal having a single polarity and essentially no ripple, said second rectifying bridge having two input terminals connected to said output terminals of said bridge circuit and two output terminals being connected to said fusing member.

15. The apparatus defined in claim 14 wherein each of said transistor pair circuits comprise:
   a pair of transistors, which provide a rectangular half-wave form signal, comprising first and second transistors, each transistor having a base uniquely connected to said driver circuit, a collector, and an emitter, said collector of said first transistor being connected to a first of said output terminals of said first rectifying bridge, said collector of said second transistor being connected to both said emitter of said first transistor and said output node, and said emitter of said second transistor being connected to a second of said output terminals of said first rectifying bridge.

16. The apparatus defined in claim 11 wherein said predetermined fusing function corresponds to a predetermined force function.

17. The apparatus defined in claim 16 wherein said means for controlling comprises:
   a force sensor which measures said force of said fusing member on said plurality of conductors and generates a corresponding force signal; and
   feedback means responsive to said force signal, said feedback means providing controlling signals to said means for moving said fusing member in order to conform to said predetermined force function.

18. The apparatus defined in claim 11 wherein said predetermined fusing function corresponds to a predetermined displacement function.

19. The apparatus defined in claim 18 wherein said means for controlling comprises:
   a displacement sensor which measures displacement of said fusing member from a predetermined location and generates a corresponding displacement signal; and
   feedback means responsive to said displacement signal, said feedback means providing controlling signals to said means for moving said fusing member in order to conform to said predetermined displacement function.

20. The apparatus defined in claim 1 wherein said predetermined physical function is based on force.

21. The apparatus defined in claim 1 wherein said predetermined physical function is based on displacement.

22. The method of using a fusing member to use together at least one armature wire and at least one piece of commutator material, the method comprising the steps of:
   moving said fusing member relative to said armature wire and said commutator material in order to cause said fusing member to contact and apply force to said commutator material thereby deforming said commutator material intimately around said armature wire;

controlling the movement of said fusing member in accordance with a predetermined physical delivery function to control said applied force;

regulating a precise flow of current through said armature wire and said commutator material from said fusing member to a grounding member to generate varying heat in said fusing member in accordance with a predetermined electrical delivery function to regulate said precise flow of current and thereby regulate the level of said varying heat so that said commutator material is softened and therefore, said deforming is precisely controlled, and so that insulation on a portion of said armature wire within said softened deformed commutator material is vaporized; and synchronizing the control of movement of said fusing member and the regulation of said flow of current in order to supply a precise varying level and quantity of heat from said fusing member to said armature wire and said commutator material at specific, predetermined time intervals, such that said step of regulating is essentially instantaneously responsive to the short timings and different heating requirements which occur during fusing of said armature wire to said commutator material.

23. The method defined in claim 22 wherein the step of regulating a flow of current comprises:

applying a potential of three-phase alternating current (AC) to a full-wave rectifier to generate a rectified signal;

converting said rectified signal into a rectangular full-wave form signal; and rectifying said rectangular full-wave form signal to provide an output signal having voltage and current components.

24. The method of claim 23 wherein the step of converting said rectified signal comprises the steps of:

causing said rectified signal to flow through a single phase inverter bridge; and controlling the operation of said inverter bridge by applying a pulse width modulated (PWM) rectangular wave form signal to said inverter bridge as a control signal, to cause said inverter bridge to generate said rectangular full-wave form signal.

25. The method of claim 24 wherein the step of controlling the operation of said inverter bridge comprises the steps of:

monitoring said current component of said output signal;

comparing said monitored current to a predetermined reference current to generate a current error signal; and adjusting said PWM rectangular wave form signal based on said current error signal.

26. The method of claim 24 wherein the step of controlling the operation of said inverter bridge comprises the steps of:

monitoring said voltage component of said output signal;

comparing said monitored voltage to a predetermined reference voltage to generate a voltage error signal;

adjusting said PWM rectangular wave form signal based on said voltage error signal.

27. The method of claim 24 wherein the step of controlling the operation of said inverter bridge comprises the steps of:

monitoring said voltage component of said output signal;

monitoring said current component of said output signal;

comparing said monitored voltage to a predetermined reference voltage to generate a voltage error signal;

comparing said monitored current to a predetermined reference current to generate a current error signal;

selecting either voltage, current, or power regulation;

if voltage regulation has been selected, adjusting said PWM rectangular wave form signal based on said voltage error signal;

if current regulation has been selected, adjusting said PWM rectangular wave form signal based on said current error signal; and if power regulation has been selected, adjusting said PWM rectangular wave form signal based on said voltage error signal and said current error signal.

28. The method defined in claim 22 wherein the step of controlling the movement of said fusing member further includes the step of providing a status signal corresponding to a status point within said predetermined fusing operation.

29. The method defined in claim 28 wherein the step of regulating the flow of current further includes providing feedback signals corresponding to said flow of current to said fusing member.

30. The method defined in claim 29 wherein the step of synchronizing comprises the steps of:

utilizing said status signal to determine a required level of said flow of current;

comparing said feedback signal to said required level of said flow of current and generating adjustment signals corresponding to the difference between said feedback signals and said required level of said flow of current;

applying said adjustment signals to said step of regulating said flow of current in order to maintain said flow of current at said required level.

31. The method defined in claim 30 wherein the step of regulating the flow of current comprises the steps of:

applying a potential of three-phase alternating current (AC) to a full-wave rectifier to generate a rectified signal;

causing said rectified signal to flow through a single-phase inverter bridge;

controlling operation of said inverter bridge by applying a pulse width modulated (PWM) rectangular wave form signal to said inverter bridge as a control signal, said PWM rectangular wave form signal being selected based upon said adjustment signals, thereby causing said inverter bridge to generate a rectangular full-wave form signal; and rectifying said rectangular full-wave form signal to provide an output signal having voltage and current components.

32. The method defined in claim 28 wherein said predetermined fusing function corresponds to a predetermined force function.

33. The method defined in claim 32 wherein said step of controlling the movement of said fusing member comprises the steps of:

measuring said force of said fusing member on said plurality of conductors; and providing a controlling signal corresponding to said measured force in order to move said fusing member in conformance with said predetermined force function.

34. The method defined in claim 28 wherein said predetermined fusing function corresponds to a predetermined displacement function.

35. The method defined in claim 34 wherein the step of controlling the movement of said fusing member comprises the steps of:
   measuring displacement of said fusing member from a predetermined location; and
   providing a controlling signal corresponding to said measured displacement in order to move said fusing member in conformance with said predetermined displacement function.

36. The method defined in claim 20 wherein said predetermined physical function is based on force.

37. The method defined in claim 20 wherein said predetermined physical function is based on displacement.

38. Apparatus for fusing at least one stator wire and at least one piece of contact hook material together, said apparatus comprising:
   a fusing member for applying force and varying heat to soften said contact hook material and to deform said contact hook material around said stator wire;
   a grounding member;
   means for moving said fusing member relative to said stator wire and said contact hook material in order to cause said fusing member to contact and apply force to said contact hook material thereby deforming said contact hook material intimately around said stator wire;
   means for controlling said means for moving said fusing member in accordance with a predetermined physical delivery function to control said applied force;
   means for regulating a precise flow of current through said stator wire and said contact hook material from said fusing member to said grounding member to generate said varying heat in said fusing member in accordance with a predetermined electrical delivery function to regulate said precise flow of current and thereby regulate the level of said varying heat so that said contact hook material is softened and therefore, said deforming is precisely controlled, and so that insulation on a portion of said stator wire within said softened deformed contact hook material is vaporized; and
   means for synchronizing said means for controlling said means for regulating in order to supply a precise varying level and quantity of heat from said fusing member to said stator wire and said contact hook material at specific, predetermined time intervals, such that said regulating means is essentially instantaneously responsive to the short timings and different heating requirements which occur during fusing of said stator wire to said contact hook material.

39. The method of using a fusing member to fuse together at least one stator wire and at least one piece of contact hook material, the method comprising the steps of:
   moving said fusing member relative to said stator wire and said contact hook material in order to cause said fusing member to contact and apply force to said contact hook material thereby forming said contact hook material intimately around said stator wire;
   controlling the movement of said fusing member in accordance with a predetermined physical delivery function to control said applied force;
   regulating a precise flow of current through said stator wire and said contact hook material from said fusing member to a grounding member to generate varying heat in said fusing member in accordance with a predetermined electrical delivery function to regulate said precise flow of current and thereby regulate the level of said varying heat so that said contact hook material is softened and therefore, said deforming is precisely controlled, and so that insulation on a portion of said stator wire within said softened deformed contact hook material is vaporized; and
   synchronizing the control of movement of said fusing member and the regulation of said flow of current in order to supply a precise varying level and quantity of heat from said fusing member to said stator wire and said contact hook material at specific, predetermined time intervals, such that said step of regulating is essentially instantaneously responsive to the short timings and different heating requirements which occur during fusing of said stator wire to said contact hook material.

* * * * *